F. BENTIVEGNA.
ASH SIFTER.
APPLICATION FILED DEC. 22, 1917.

1,294,757.

Patented Feb. 18, 1919.

INVENTOR:
Filippo Bentivegna
by Macleod, Calver, Copeland & Dike
Attys.

UNITED STATES PATENT OFFICE.

FILIPPO BENTIVEGNA, OF BOSTON, MASSACHUSETTS.

ASH-SIFTER.

1,294,757. Specification of Letters Patent. Patented Feb. 18, 1919.

Application filed December 22, 1917. Serial No. 208,348.

*To all whom it may concern:*

Be it known that I, FILIPPO BENTIVEGNA, a subject of the King of Italy, residing at Boston, county of Suffolk, State of Massachusetts, have invented a certain new and useful Improvement in Ash-Sifters, of which the following is a specification, reference being had therein to the accompanying drawings.

The invention relates to a new and useful improvement in ash shifters. One great drawback to ash sifters in common use, especially for domestic use, is the escape of dust during the operation of sifting the ashes. This is especially objectionable while the sifting is done in a house whether in the kitchen or in the cellar. One object of the present invention is to provide an ash sifter with means for preventing the escape into the air of fine particles of the ashes during the process of sifting, and also to combine with the ash sifter a sprinkler which will reduce the amount of dust raised even within the casing which incloses the sieve, and which will serve to wash the lumps which remain in the sieve after the fine particles of ashes have been sifted out.

Another object of the invention is to provide a receptacle into which the ashes will fall from the sifter, said receptacle serving as a support for the casing of the sifter and from which the sifter is easily separable, said receptacle being provided with a handle by which it can be easily carried to dump the ashes in a proper dumping place after the sifter is de-mounted therefrom.

The invention will be fully understood by reference to the following description taken in connection with the accompanying drawings and the novel features thereof will be pointed out and clearly defined in the claims at the close of this specification.

In the drawings, Figure 1 is a vertical longitudinal sectional view of a device embodying my invention.

Figure 4:
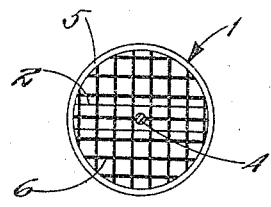
Fig. 4 is an end view of the sieve as viewed from the right in Fig. 1.

Referring now to the drawings, the sieve portion of the sifter consists of a cylindrical reticulated drum 1, preferably made for the most part of wire and provided at the ends with cross bars 2, 3 respectively to receive the shaft 4 to which said cross bars are made fast in order that the sieve may rotate with the shaft. There is preferably provided around the sieve at each end a hoop 5 to stiffen the sieve and receive the ends of the lengthwise wires of the sieve. One end of the cylinder is also provided with a head 6 of wire netting. The other end of the cylinder is provided with a hinged cover 7 having an annular flange 8 which shuts outside of the hoop 5 and is hinged at 9 so that the said cover may be turned back on its hinge to open that end of the cylinder. Both ends of the shaft 4 are prolongated. One of the prolongated ends passes through a slot 10 in the cover 7 and the other prolongated end passes out through the opposite head of the cylinder and is formed with a crank handle 11 by which the sieve may be rotated. The slot 10 in the cover extends radially outward to the outer periphery of the cover so that the cover may be turned back on its hinge 9 into open position without interference with the prolongations of the shaft.

Figure 2:
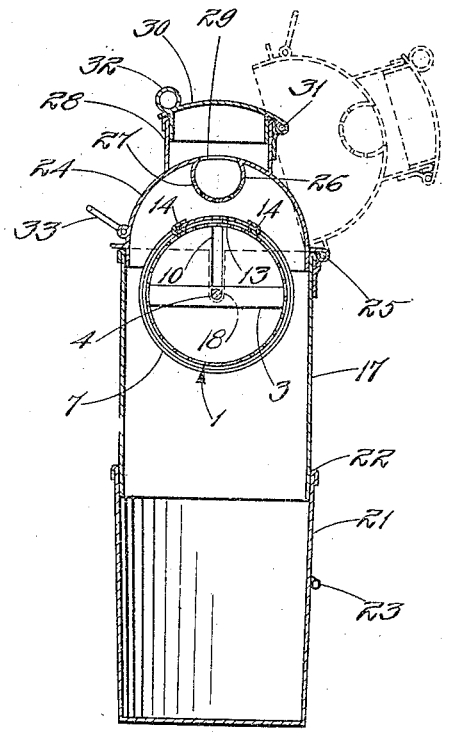
Fig. 2 is a vertical transverse section on line 2—2 of Fig. 1.

The wire cylinder is formed with a large opening 12 in one side through which the combined ashes and coal or clinkers which come from the rakings of the furnace or stove may be poured into the sieve. A slide cover or gate 13 is provided which is slidable in grooved ways in the longitudinal metal strips 14, 14, said metal strips being doubled over as shown in Fig. 2 to form grooved ways for the sliding of the cover 13 to open and close the same. The said slide cover is formed with a handle 16 to manipulate the slide.

The cylindrical sieve is journaled in a casing 17 the end walls of which are formed with vertical slots 18, the bottoms of said slots forming bearings for the shaft 4. Said slots extend upward to the upper edge of the casing so that said shaft with the sieve attached can be lifted out of the case to remove the contents of the sieve after the sifting is completed so that the sieve may easily be put back into its bearings after the sieve has been emptied of its contents.

The bottom of the casing or hopper is provided with a downwardly tapering funnel portion 19 terminating in a cylindrical lower portion 20 which is adapted to fit into the top of a suitable cylindrical bucket 21. The inclined sides of the funnel portion 19 are seated upon the rim 22 of the bucket to support the casing of the sifter during the sifting operation and the inclined walls 19 also direct the ash portion which comes out of the sieve down into the bucket 21.

The bucket 21 is preferably provided with a bail 23 or other suitable handle which will be out of the way when the sifter is mounted upon the bucket and which is utilized for handling the bucket after the sifter is removed therefrom so that the bucket may be carried to any place for dumping the contents thereof.

A dome-shaped cover 24 is provided for the casing 17, said cover being hinged at 25 to one side of the casing at its upper edge. The cover is turned back on its hinge as shown by dotted lines in Fig. 2, to permit the sieve to be introduced into the casing and to be removed therefrom and it is closed during the sifting operation so as to prevent the dust from coming out into the room.

In order to dampen the ashes so as to make less dust during the sifting and also to wash the contents of the sifter after the ashes have been sifted out of it before the sieve is removed a sprinkling device is provided within the dome shaped cover. The preferred form of sprinkler device is as follows: A perforated cylinder 26 is mounted just under the roof of the dome shaped cover extending lengthwise thereof and formed with a large number of small perforations 27 in the bottom and in the sides of said cylinder. On the top of the dome cover 24 there is provided a curb or tank 28. Inside of the boundaries of the curb there is a hole 29 through the cover and opening into the top of the perforated cylinder 26. The curb is provided with a cover 30, preferably hinged at one side as at 31, and having a handle 32 by which the cover may be turned back on its hinge.

The dome cover 24 is provided with a handle 33 by means of which the dome cover may be easily turned back on its hinge. The case 17 is preferably provided with handles 34 by means of which the case may be lifted so as to remove it from its seat on the bucket.

Figure 1:
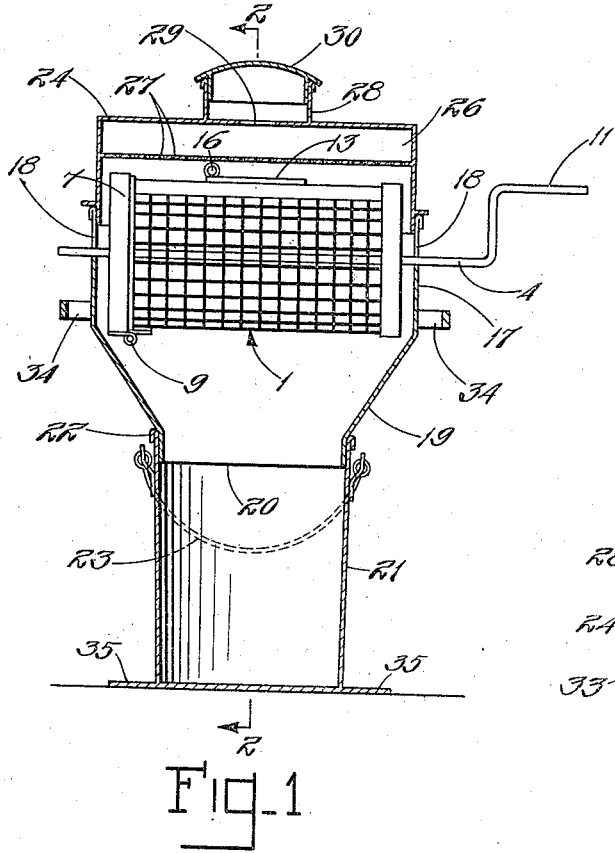
Figure 3:
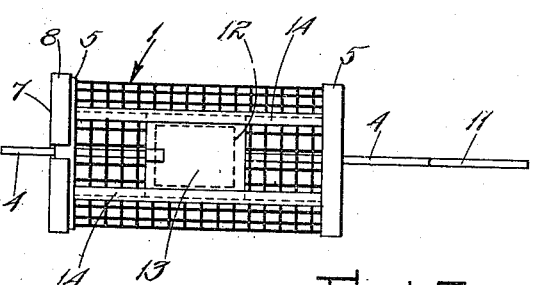
Fig. 3 is a detail view of the sieve itself removed from its mounting.
Figure 5:
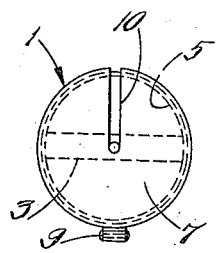
Fig. 5 is an end view of the sieve as viewed from the left in Fig. 1.

Normally when the device is not in use and when the bucket and sifter are empty the case 17 of the sifter would be mounted upon the bucket 21 as shown in Fig. 1.

When it is desired to use the device the dome cover 24 will be turned back on its hinge and the cylindrical sieve will be turned until the slide 13 comes to the top. The slide will then be moved so as to uncover the entrance opening 12 and the unsifted ashes will be poured into the sieve through said opening and the slide 13 will then be closed. The dome cover 24 will also then be closed and the cylindrical sprinkler 26 will be filled with water, the curb 28 allowing sufficient water to be put in to more than fill the cylinder 26 and rise in the curb. The cover 30 to the curb will then be closed. Water will slowly trickle through the apertures 27 and dampen the contents of the sieve so as to reduce the amount of dust that will arise. The crank handle 23 will then be turned, thus rotating the sieve and the rotary movement will cause the ashes to sift through the meshes of the sieve and drop down through the tapered hopper portion 19 into the bucket 21.

After the sieve has been rotated sufficiently to cause all of the ashes and fine particles that can go through the meshes of the sieve to pass out, the dome cover 24 will be opened and the sieve will be lifted out of its bearings as permitted by its vertical slots. The closed sieve which now contains the solid matter which is to be burned again can be used as a holder to carry it to some place where the siftings are kept or it may be immediately dumped into another receptacle by first opening the hinged end cover 7 so that the contents can be poured out of the end of the cylindrical sieve. Or if desired, they can be poured therefrom directly into the stove. The sieve will then be replaced in its bearings and the case 17 will be lifted away from the bucket 21. The ashes which were sifted from the solid matter which now are in the bucket 21 can easily be carried away and dumped in the proper place for ashes. Then the parts can again be assembled as shown in Fig. 1 ready for the next time of use.

Preferably the bottom of the bucket 21 is provided with laterally extending flanges 35 at the bottom on which the operator will place his feet to steady the device while he is rotating the sieve.

What I claim is:

1. An ash sifter comprising a sieve, a casing in which said sieve is journaled, a cover hinged to the casing above the sieve, and a water sprinkler chamber secured to the inside of the cover and carried by the cover when the cover is swung open on its hinge, said sprinkler chamber being formed with small apertures through which water is allowed to sprinkle onto the contents of the sieve when the cover is closed.

2. An ash sifter comprising a sieve, a casing in which said sieve is journaled, a cover hinged to the casing above the sieve, a water sprinkler chamber secured to the inside of the cover, said sprinkler chamber being formed with small apertures through which water is allowed to sprinkle onto the contents of the sieve when the cover is closed, and a water supply tank mounted on the top of said cover, said tank having a supply passage to said sprinkler chamber, said tank and sprinkler chamber both being carried by the cover when the cover is swung open.

3. An ash sifter comprising a rotary sieve, a casing in which said sieve is journaled, a cover hinged to the casing above the sieve, a water sprinkler chamber secured to the inside of the cover and extending lengthwise above the sieve when the cover is closed, said sprinkler chamber being formed with small apertures through which water is allowed to sprinkle onto the contents of the sieve when the cover is closed, and a water supply tank mounted on the top of said cover, said tank having a supply passage to said sprinkler chamber, said tank and sprinkler chamber both being carried by the cover when the cover is swung open.

In testimony whereof I affix my signature.

FILIPPO BENTIVEGNA.

Copies of this patent may be obtained for five cents each, by addressing the "Commissioner of Patents, Washington, D. C."